Aug. 30, 1938. W. G. STEVENS, JR 2,128,860
MEANS FOR ELEVATING AND LOWERING PLANTER RUNNERS
Filed July 12, 1937 3 Sheets-Sheet 2

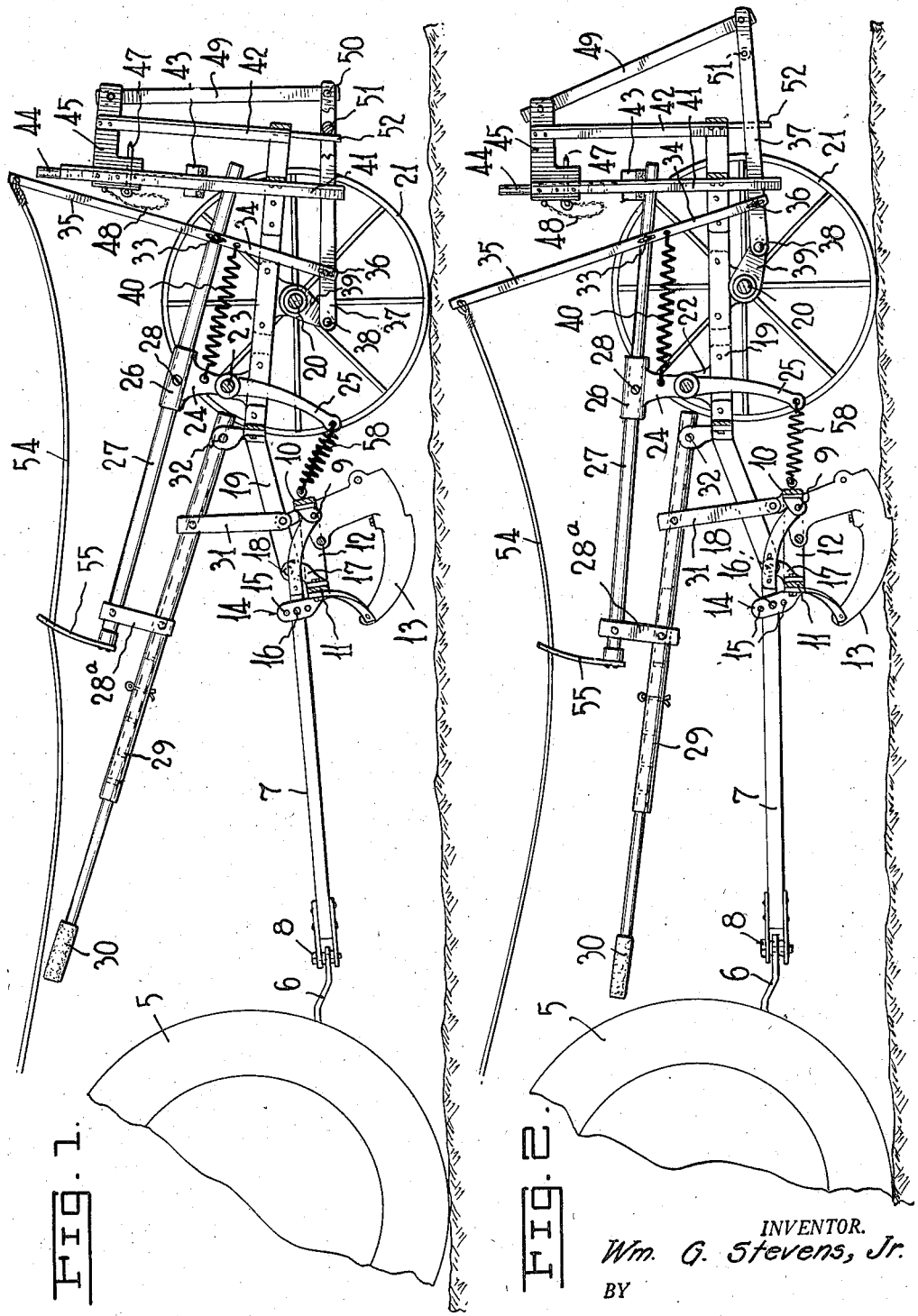

INVENTOR.
Wm. G. Stevens, Jr.
BY
Seymour, Bright & Nottingham
ATTORNEYS.

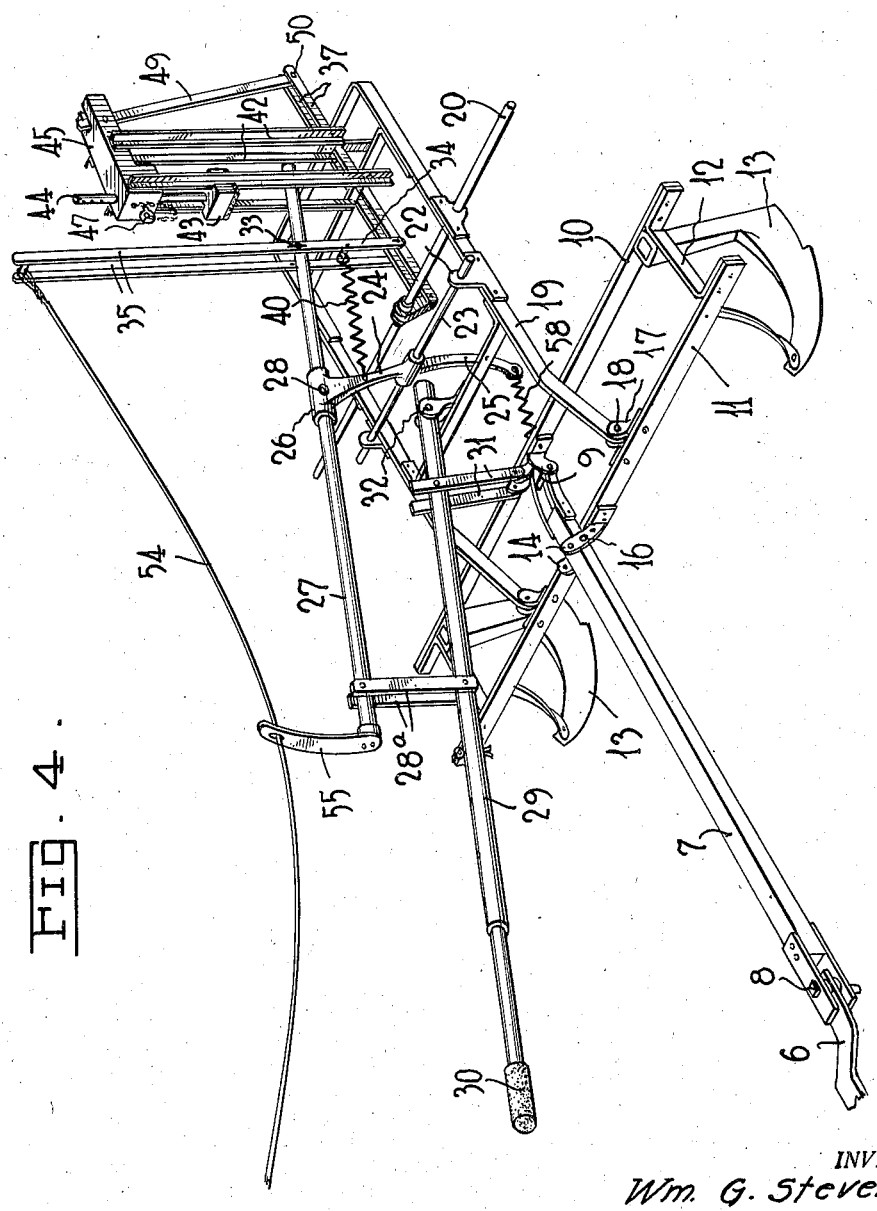

Patented Aug. 30, 1938

2,128,860

UNITED STATES PATENT OFFICE 2,128,860

MEANS FOR ELEVATING AND LOWERING PLANTER RUNNERS

William G. Stevens, Jr., Sykesville, Md.

Application July 12, 1937, Serial No. 153,224

18 Claims. (Cl. 97—236)

This invention relates to improved means to enable the driver of a tractor to raise and lower the runners of a towed corn planter or the like.

It is well-known that the device, as now in use for raising and lowering such runners, requires that an operator of a tractor either dismount from his seat to take care of the runners, or that he exert considerable force and give attention, which might otherwise be devoted to the tractor, to the raising, lowering or setting of the runners at a desired depth.

The primary purpose of the present invention is to provide improved means which will permit the tractor operator, with little effort and without glancing backward, to raise, lower or set the runners at the desired depth.

Another object is to provide improved means for holding the runners in raised position when it is desired to transport the planter without the runners contacting with the ground.

A further object is to furnish novel means to enable the operator to adjust the depth of the runners without the use of any tool.

A still further and important object of the invention is to supply improved means to replace certain parts of a horse-drawn corn planter or the like, so that such a planter may be converted into one that may be readily controlled by the operator of a tractor.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a longitudinal vertical sectional view of portions of a corn planter provided with my improvements and shown with its tongue connected to the rear end portion of a motor-driven tractor. In this view parts unessential to the invention are not illustrated and the runners of the planter are shown in raised position.

Fig. 2 is a similar view with the runners in lowered position.

Fig. 4 is an isometric perspective with certain parts removed to facilitate illustration.

Figure 3:
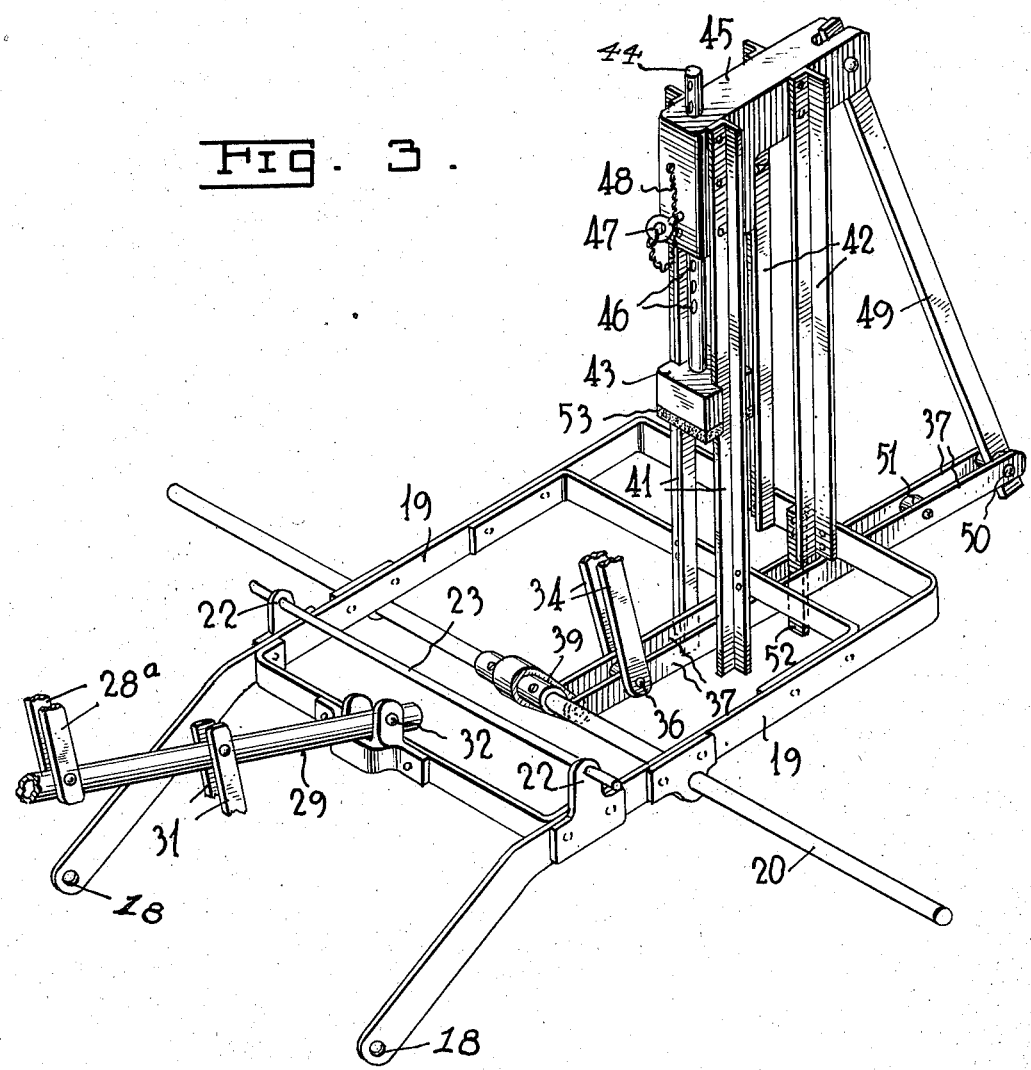
Fig. 3 is a perspective view of certain parts of my improved mechanism.

Referring to the drawings, 5 designates the rear end portion of a conventional tractor having a tow piece 6 to which the tongue 7 of a corn planter is connected by means of a joint 8 permitting universal swinging of the tongue.

The rear end of the tongue is secured at 9 to the rear transverse bar 10 of a runner frame, the front transverse bar of which is shown at 11. The ends of these bars are rigidly connected to the end bars 12 of the frame, and the runners 13 are suspended from the frame.

The front bar is provided with upstanding brackets 14 having series of apertures 15 to accommodate a bolt 16 that secures the front of the runner frame to the tongue. The purpose of the apertures 15 is to permit angular adjustment of the runners relatively to the ground.

The front bar of the runner frame is provided with other upstanding brackets 17 that are pivotally connected at 18 to the front ends of the side bars 19 of the main frame of the planter. The latter frame has its medial portion pivotally mounted on the main axle 20 which is supported by the wheels 21.

Brackets 22 on the main frame carry a rock shaft 23 on which is mounted a rocking lever having an upstanding arm 24 and a depending leg 25. The arm terminates in a sleeve 26 through which passes a rigid rod 27 that is adjustably secured to the sleeve by any suitable means, such as a screw 28. The forward end portion of the rod lies immediately above the tongue 7 and it is connected by depending links 28a to a lifting lever 29 which lies immediately over the tongue. The lever is preferably of telescopic formation to permit its length to be adjusted, and it is provided at its forward end with a handle 30, which will lie immediately under the seat of the tractor so that the operator can reach down and lift the lever 29 when it is desired to raise the runners.

Links 31 pivotally connect the rear end portion of the lifting lever to the rear bar of the runner frame, and the rear end of the lever is pivotally mounted at 32 to a cross beam between the side bars 19 of the main frame of the planter.

With the mechanism so far described, it will be understood that if the forward end of the lever 29 is lifted, the links 31 will act to raise the runner frame, runners, and the rear end of the tongue 7, and consequently the main frame of the planter will be swung in a clockwise direction about the main axle 20.

In order to hold the runners in either raised or lowered position, the rear portion of the rod 27 is pivotally connected at 33 to the medial portions of links 34 which have upstanding portions 35. The lower ends of the links are pivotally connected at 36 to toggle links 37; the latter being pivotally connected at 38 to another toggle link 39 which is pivotally connected to the main axle. Link 39 swings between two collars on axle 20.

A coil spring 40 which cooperates with the toggle has one of its ends connected to the arm 24 and the other end connected to the links 34 at a point between the pivot points 33 and 38. It will therefore be understood that when the rod is swung in a clockwise direction about the shaft 23 during the raising of the hand lever, the links 34 will act to collapse the toggle structure and immediately the pivot 38 goes beyond dead center, the spring 40 will act to complete the movement of the toggle into collapsed position. On the other hand, if the parts are in raised position and the upper ends 35 of the links 34 are moved forwardly in a counter-clockwise direction about the pivot 33, the toggle structure will be moved into the extended position shown in Fig. 2, and the weight of the runner structure will act to hold the runner structure in lower position.

For the purpose of adjusting the depth of the runners by simple means not liable to be interfered with by the elements and capable of use without employing any tool, I have provided the improved means shown at the rear end of the planter. This means preferably consists of front and rear posts 41 and 42 respectively, which are rigidly mounted on the rear end portion of the main frame. The front posts are spaced apart and the rear end of the rod 27 extends between the same so that it may cooperate with an upwardly and downwardly movable stop or abutment 43. As best shown in Fig. 3, the stop is of H shape, and it is guided by the front posts. A rod 44 is rigidly connected with the stop and extends upwardly through a bracket 45 supported by the posts. The bracket is provided with an aperture and the rod has a series of apertures 46 to receive a pin 47 employed in adjustably securing the rod to the bracket. The pin is preferably secured to the bracket by a chain 48 to prevent loss thereof. A suspending link 49 has its upper end pivotally connected to the bracket and its lower end pivotally connected at 50 to the rear ends of the toggle links 37. An abutment 51, secured to the toggle links 37, cooperates with a depending stop 52 carried by the main frame to limit the upward movement of the runners.

The stop 43 is preferably provided with a rubber pad 53 or the like to function as a shock absorber for the rod 27.

It will be obvious that the depth of the runners may be adjusted either by means of the pin 16 or by raising or lowering the stop 43 or by both of these means.

It will be noted that the posts 41 project downwardly below the main frame and function as guides for the toggle links 37.

To permit the operator to lower the runner structure, a rope or the like 54 has one of its ends secured to the upper end of one of the links 35, and its other end will be secured adjacent to the driver's seat of the tractor. In order to guide the rope, it may pass through a guide member 55 secured to the forward end of the rod 27.

A balancing spring 58 connects the leg 25 to the rear bar of the runner frame, and functions to neutralize the weight of the hand lever extending forwardly above the tongue of the planter.

In operation, the operator will use the pin 16, 47 or both to hold the runners at the proper depth and each time the operator of the tractor reaches the end of a row of corn or the like, he simply reaches down, grips the handle 30 and raises the forward end of the lever 29. This results in the raising of the runner structure and the swinging of the main frame about the main axle until the spring 40 cooperates with the toggle structure to maintain the parts in raised position, at which time the abutment 51 will come into engagement with the stop 52 as shown in Fig. 1. After the tractor has been turned, the operator simply pulls on the rope 54 and this causes the links 35 to swing about the pivot 33 with the result that the pivot point 38 is moved rearwardly and the rod 27 is swung in a counter-clockwise direction about its shaft 23. The weight of the parts will then cause lowering of the structure until the rear end of the rod 27 comes into engagement with the pad on the stop 43.

Due to my improved construction, it will be understood that the operator can give all of his attention to the handling of the tractor, as he can raise and lower the runner structure and be sure that the runners are at proper depth without even glancing back at the planting mechanism.

While I have disclosed what I now consider to be a preferred embodiment of the invention in such manner that the same may be readily understood by those skilled in the art, I am aware that changes may be made in the details disclosed without departing from the spirit of the invention as expressed in the claims.

What I claim and desire to secure by Letters Patent is:

1. The combination with a tractor, of a planter having a forwardly extending tongue connected to the rear end of the tractor, said planter having a main frame and a runner structure, said tongue being rigidly connected at its rear end to the runner structure, an axle forming part of the planter, the main frame being pivotally mounted on said axle, a hand lever having its rear end portion pivotally connected to the main frame, said lever extending forwardly and having a handle at its front end arranged above the front end of the tongue, means connecting a medial portion of the hand lever to the runner structure for use in lifting the latter when the lever is raised, and means cooperating with the lever for automatically locking the runner structure in raised position as soon as the lever is raised to a predetermined position.

2. A planter comprising a wheel supported axle, a main frame mounted on said axle for movement about a horizontal axis, a runner structure operatively connected to the main frame, a tongue rigidly connected to the runner structure and projecting forwardly therefrom, a hand lever having its rear end operatively connected to the main frame, said lever extending forwardly above the tongue and having a handle arranged above the front end of the tongue, means operatively connecting a medial portion of said lever to said runner structure for raising the latter, and means cooperating with the lever for automatically locking the runner structure in raised position after the front end of said lever has been raised to a predetermined position.

3. A planter comprising a wheel supported axle, a main frame pivotally mounted on said axle for movement about a horizontal axis, a runner structure operatively connected to the main frame, a tongue rigidly connected to the runner structure and projecting forwardly therefrom, a hand lever having its rear end operatively connected to the main frame, said lever extending forwardly above the tongue and having a handle arranged above the front end of the tongue, means operatively connecting a medial portion of said lever to said runner structure for raising the latter, means cooperating with the lever for automatically locking the runner structure in raised position after the front end of said lever has been raised to a predetermined position, and means cooperating with the last mentioned means for limiting the depth to which the runner structure may penetrate the ground.

4. A planter comprising a wheel supported axle, a main frame pivotally mounted on said axle for movement about a horizontal axis, a runner structure operatively connected to the main frame, a tongue rigidly connected to the runner structure and projecting forwardly, a hand lever having its rear end operatively connected to the main frame, said lever extending forwardly above the tongue and having a handle arranged above the front end of the tongue, means operatively connecting a medial portion of said lever to said runner structure for raising the latter, and means including a toggle structure cooperating with the lever for automatically locking the runner structure in raised position after the front end of said lever has been raised to a predetermined position.

5. A planter comprising a wheel supported axle, a main frame pivotally mounted on said axle for movement about a horizontal axis, a runner structure operatively connected to the main frame, a tongue rigidly connected to the runner structure and projecting forwardly therefrom, a hand lever having its rear end operatively connected to the main frame, said lever extending forwardly above the tongue and having a handle arranged above the front end of the tongue, means operatively connecting a medial portion of said lever to said runner structure for raising the latter, means cooperating with the lever for automatically locking the runner structure in raised position after the front end of said lever has been raised to a predetermined position, and a device cooperating with the last mentioned means for adjustably regulating the depth to which the runner structure can penetrate the soil.

6. A planter comprising a wheel supported axle, a main frame pivotally mounted on said axle for movement about a horizontal axis, a runner structure operatively connected to the main frame, a tongue rigidly connected to the runner structure and projecting forwardly therefrom, a hand lever having its rear end operatively connected to the main frame, said lever extending forwardly above the tongue and having a handle arranged above the front end of the tongue, means operatively connecting a medial portion of said lever to said runner structure for raising the latter, a rod operatively connected to the lever and pivotally mounted on the main frame for movement about a horizontal axis, and adjustable means cooperating with the rod to limit the depth to which the runner structure may penetrate the soil.

7. A planter comprising a wheel supported axle, a main frame pivotally mounted on said axle for movement about a horizontal axis, a runner structure operatively connected to the main frame, a tongue rigidly connected to the runner structure and projecting forwardly therefrom, a hand lever having its rear end operatively connected to the main frame, said lever extending forwardly above the tongue and having a handle arranged above the front end of the tongue, means operatively connecting a medial portion of said lever to said runner structure for raising the latter, posts mounted on the main frame, a bracket supported by the posts, an abutment guided by the posts, an apertured rod secured to the abutment and slidable in the bracket, and a pin adapted to be passed through a hole in the bracket and any of the apertures for adjustably regulating the height of said abutment, and a member actuated by said lever and cooperating with said abutment to limit the depth to which the runner structure may penetrate the soil.

8. The combination with a tractor, of a planter towed by the tractor and having a forwardly extending tongue, said planter having a wheel supported axle, a main frame operatively connected to the tongue and pivotally mounted on said axle, a hand lever having its rear end connected to said frame, said lever extending forwardly from the main frame over the tongue and having a handle arranged above the forward end of the tongue, a runner structure depending from the tongue and main frame, means connecting a medial portion of the lever to the runner structure for use in lifting the runner structure and swinging the main frame about said axle when the handle of the lever is raised, and means cooperating with said lever for automatically locking the runner structure in raised position when the handle has been raised to a predetermined position.

9. The combination with a tractor, of a planter towed by the tractor and having a forwardly extending tongue, said planter having a wheel supported axle, a main frame operatively connected to the tongue and pivotally mounted on said axle, a hand lever having its rear end connected to said frame, said lever extending forwardly from the main frame over the tongue and having a handle arranged above the forward end of the tongue, a runner structure depending from the tongue and main frame, means connecting a medial portion of the lever to the runer structure for use in lifting the runner structure and swinging the main frame about said axle when the handle of the lever is raised, means cooperating with said lever for automatically locking the runner structure in raised position when the handle has been raised to a predetermined position, and means for unlocking the last mentioned means and provided with a manually actuated member extending forwardly toward the tractor.

10. The combination with a tractor, of a planter towed by the tractor and having a forwardly extending tongue, said planter having a wheel supported axle, a main frame operatively connected to the tongue and pivotally mounted on said axle, a hand lever having its rear end connected to said frame, said lever extending forwardly from the main frame over the tongue and having a handle arranged above the forward end of the tongue, a runner structure depending from the tongue and main frame, means connecting a medial portion of the lever to the runner structure for use in lifting the runner structure and swinging the main frame about said axle when the handle of the lever is raised, and means connected with said lever for adjustably limiting the depth to which the runner structure may penetrate the soil.

11. In a structure of the character described, a planter having a main wheel-supported frame provided with a forwardly extending tongue, parallel posts mounted on the rear end of the frame, a bracket arranged at the upper end of the posts and having an aperture, an abutment slidably mounted between the posts and having an upstanding rod cooperating with the bracket, said rod being provided with a series of apertures, a pin adapted to be passed through the aperture of the bracket and through any of the apertures of the rod for adjustably securing the abutment at various elevations, a runner structure operatively connected to the main frame and tongue, a hand lever arranged immediately above the tongue and operatively connected to the main frame and to the runner structure for raising the latter, and means operatively connected to the lever and engageable with said abutment for limiting the depth to which the runner structure may penetrate the soil.

12. In a planter, a wheel-supported axle, a main frame mounted on the axle for movement about a horizontal axis, a runner structure operatively connected to the main frame, a tongue rigidly connected to the runner structure and projecting forwardly therefrom, a hand lever having its rear end operatively connected to the main frame and its medial portion operatively connected to the runner structure, said lever projecting forwardly over the tongue and having a handle positioned above the forward end of the tongue, a lever having its medial portion pivotally mounted on the main frame for movement about a horizontal axis arranged parallel to the first mentioned axis, a rod extending longitudinally of the frame and having its medial portion secured to the upper end portion of the last mentioned lever, a spring connecting the lower end of the last mentioned lever to the runner structure, means connecting the forward end portion of said rod to the medial portion of the hand lever, and means operatively associated with the rear end portion of said rod for automatically locking the runner structure in raised position after said hand lever has been raised to a predetermined position, and for adjustably regulating the depth to which the runner structure may penetrate the soil.

13. Means for automatically locking the runner structure of a planter in raised position after such structure has been raised to a predetermined position comprising a wheel supported axle, a main frame pivotally mounted on the axle, a runner structure operatively connected with the main frame, a lever pivotally mounted on said frame for movement about a horizontal axis parallel to said axle, a rod having its medial portion secured to said lever, means operatively connecting the runner structure to said rod a link having its medial portion pivotally connected to the rear end portion of said rod for movement about a horizontal axis, a toggle link pivotally connected to the lower end of the last mentioned link, a second toggle link having one of its ends pivotally mounted on said axle and its other end pivotally connected to the first mentioned toggle link, and a coil spring connecting said lever to the first mentioned link at a point below that at which the first mentioned link is connected to said rod.

14. A planter comprising a wheel-supported axle, a main frame mounted on said axle for rocking movement about a horizontal axis, a runner structure operatively connected to the main frame, a tongue rigidly connected to the runner structure and projecting forwardly therefrom, a hand lever having its rear end pivotally connected to the frame for movement about a horizontal axis, said lever extending forwardly above the tongue and having a handle at its front end portion above the front end of the tongue, means connecting the medial portion of the lever to the runner structure for use in raising the latter when the lever is raised, a second lever having its medial portion pivotally carried by the main frame for movement about a horizontal axis arranged forwardly of said axle, a balancing spring connecting the lower end of the second lever to said runner structure, a rod extending longitudinally of the frame and having its medial portion secured to the upper end of the second lever, means connecting the forward end portion of the rod to the medial portion of the hand lever, a link having its medial portion pivotally connected to the rear end portion of the rod, a toggle link pivotally connected to the lower end of the first mentioned link, a second toggle link pivotally mounted on said axle and pivotally connected to one end of the first mentioned toggle link, and a coil spring having one of its ends connected to the second lever and its other end connected to the first mentioned link at a point below that at which said link is connected to the rod.

15. A planter comprising a wheel-supported axle, a main frame mounted on said axle for rocking movement about a horizontal axis, a runner structure operatively connected to the main frame, a tongue rigidly connected to the runner structure and projecting forwardly therefrom, a hand lever having its rear end pivotally connected to the frame for movement about a horizontal axis, said lever extending forwardly above the tongue and having a handle at its front end portion above the front end of the tongue, means connecting the medial portion of the lever to the runner structure for use in raising the latter when the lever is raised, a second lever having its medial portion pivotally carried by the main frame for movement about a horizontal axis arranged forwardly of said axle, a balancing spring connecting the lower end of the second lever to said runner structure, a rod extending longitudinally of the frame and having its medial portion secured to the upper end of the second lever, means connecting the forward end portion of the rod to the medial portion of the hand lever, a link having its medial portion pivotally connected to the rear end portion of the rod, a toggle link pivotally connected to the lower end of the first mentioned link, a second toggle link pivotally mounted on said axle and pivotally connected to one end of the first mentioned toggle link, a coil spring having one of its ends connected to the second lever and its other end connected to the first mentioned link at a point below that at which said link is connected to the rod, and adjustable means mounted on the frame and cooperating with the rear end portion of said rod for limiting the upward movement of the latter.

16. A planter comprising a wheel-supported axle, a main frame mounted on said axle for rocking movement about a horizontal axis, a runner structure operatively connected to the main frame, a tongue rigidly connected to the runner structure and projecting forwardly therefrom, a hand lever having its rear end pivotally connected to the frame for movement about a horizontal axis, said lever extending forwardly above the tongue and having a handle at its front end portion above the front end of the tongue, means connecting the medial portion of the lever to the runner structure for use in raising the latter when the lever is raised, a second lever having its medial portion pivotally carried by the main frame for movement about a horizontal axis arranged forwardly of said axle, a balancing spring connecting the lower end of the second lever to said runner structure, a rod extending longitudinally of the frame and having its medial portion secured to the upper end of the second lever, means connecting the forward end portion of the rod to the medial portion of the hand lever, a link having its medial portion pivotally connected to the rear end portion of the rod, a toggle link pivotally connected to the lower end of the first mentioned link, a second toggle link pivotally mounted on said axle and pivotally connected to one end of the first mentioned toggle link, a coil spring having one of its ends connected to the second lever and its other end connected to the first mentioned link at a point below that at which said link is connected to the rod, and means carried by the main frame and cooperating with the toggle links to limit clockwise movement of the toggle links about said axle.

17. A planter comprising a wheel-supported axle, a main frame mounted on said axle for movement about a horizontal axis, a runner structure pivotally connected to the front end of said frame, a tongue rigidly connected to the runner structure and projecting forwardly therefrom, a hand lever having its rear end pivotally connected to the main frame at a point between said axle and the runner structure, said lever extending forwardly above the tongue and having a handle arranged above the front end of the tongue, means operatively connecting a medial portion of said lever to said runner structure for raising the latter and the rear end of the tongue, and means cooperating with the lever for automatically locking the runnner structure in raised position after the front end of said lever has been raised to a predetermined position.

18. A planter comprising a wheel-supported axle, a main frame mounted on said axle for movement about a horizontal axis, a runner structure pivotally connected to the front end of said frame, a tongue rigidly connected to the runner structure and projecting forwardly therefrom, a hand lever having its rear end pivotally connected to the main frame at a point between said axle and the runner structure, said lever extending forwardly above the tongue and having a handle arranged above the front end of the tongue, means operatively connecting a medial portion of said lever to said runner structure for raising the latter and the rear end of the tongue, means cooperating with the lever for automatically locking the runner structure in raised position after the front end of said lever has been raised to a predetermined position, and means for unlocking the last-mentioned means and provided with a manually actuated member extending forwardly toward the forward end of the tongue.

WILLIAM G. STEVENS, Jr.